(12) United States Patent
Wang et al.

(10) Patent No.: US 11,355,776 B2
(45) Date of Patent: Jun. 7, 2022

(54) CELL AND BATTERY

(71) Applicant: NINGDE AMPEREX TECHNOLOGY LIMITED, Ningde (CN)

(72) Inventors: Feng Wang, Ningde (CN); Yu Chen, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 200 days.

(21) Appl. No.: 16/431,568

(22) Filed: Jun. 4, 2019

(65) Prior Publication Data

US 2020/0194817 A1 Jun. 18, 2020

(30) Foreign Application Priority Data

Dec. 18, 2018 (CN) .......................... 201811547623.5

(51) Int. Cl.
*H01M 10/04* (2006.01)
*H01M 10/0583* (2010.01)
(Continued)

(52) U.S. Cl.
CPC ..... *H01M 10/045* (2013.01); *H01M 10/0431* (2013.01); *H01M 10/0459* (2013.01);
(Continued)

(58) Field of Classification Search
CPC ............ H01M 50/105; H01M 50/178; H01M 50/183; H01M 50/03; H01M 10/045;
(Continued)

(56) References Cited

U.S. PATENT DOCUMENTS

2011/0223448 A1* 9/2011 Kim .................... H01M 50/342
429/53
2014/0370372 A1* 12/2014 Kong ................... H01M 50/116
429/185
(Continued)

FOREIGN PATENT DOCUMENTS

CN 1495934 A 5/2004
CN 104067403 A 9/2014
(Continued)

OTHER PUBLICATIONS

English Translation of JP 2012003919A.; Ueno Tomohiro, 2012, Hitachi Maxell Energy LTD (Year: 2012).*
(Continued)

*Primary Examiner* — Maria Laios
*Assistant Examiner* — Adam J Francis
(74) *Attorney, Agent, or Firm* — Morgan, Lewis & Bockius LLP (57) ABSTRACT

The present disclosure provides a cell and a battery. The cell includes a cell body and a packaging pouch configured to accommodate the cell body therein. The packaging pouch includes a seal portion, the seal portion includes a sealed area, and the sealed area defines a cavity therein. According to embodiments of the present disclosure, the seal strength
(Continued)

of the seal portion of the cell may be increased significantly, and the reliability and safety of the cell may be improved.

18 Claims, 9 Drawing Sheets

(51) Int. Cl.
    *H01M 50/116* (2021.01)
    *H01M 50/557* (2021.01)
    *H01M 50/572* (2021.01)

(52) U.S. Cl.
    CPC ..... *H01M 10/0583* (2013.01); *H01M 50/116* (2021.01); *H01M 50/557* (2021.01); *H01M 50/572* (2021.01); *H01M 2220/20* (2013.01); *H01M 2220/30* (2013.01)

(58) Field of Classification Search
    CPC ......... H01M 10/0431; H01M 10/0459; H01M 10/0583; H01M 50/116; H01M 50/572; H01M 50/557
    See application file for complete search history.

(56) References Cited

U.S. PATENT DOCUMENTS

| | | | |
|---|---|---|---|
| 2015/0037663 A1 | 2/2015 | Uhm et al. | |
| 2017/0012252 A1* | 1/2017 | Yoo | H01M 10/0404 |
| 2019/0067653 A1* | 2/2019 | Morehead | H01M 8/028 |

FOREIGN PATENT DOCUMENTS

| | | | | |
|---|---|---|---|---|
| CN | 203850366 U | 9/2014 | | |
| CN | 106058083 A | 10/2016 | | |
| CN | 106062992 A | 10/2016 | | |
| CN | 107546342 A | 1/2018 | | |
| CN | 107863550 A | 3/2018 | | |
| CN | 207938661 U | 10/2018 | | |
| JP | 2005332726 A | 12/2005 | | |
| JP | 4830267 B2 | 12/2011 | | |
| JP | 2011258438 A | 12/2011 | | |
| JP | 2012-3919 A | 1/2012 | | |
| JP | 2012003919 A | * | 1/2012 | ............. Y02E 60/10 |
| JP | 2017228381 A | 12/2017 | | |
| KR | 20180054297 A | * | 5/2018 | .......... H01M 10/052 |

OTHER PUBLICATIONS

English Translation of KR 2018/0054297A, A pouch for an battery having enhanced sealing performance and a battery comprising the same, LG Chem. LTD, May 24, 2018 (Year: 2018).*
International Search Report and Written Opinion, PCT/CN2019/126423, dated Mar. 19, 2020, 8 pgs.
Office Action, CN201811547623.5, dated Nov. 4, 2020, 10 pgs.
Office Action, CN201811376277.9, dated Nov. 20, 2020, 10 pgs.
Office Action, CN201811547623.5, dated Apr. 9, 2021, 10 pgs.
Office Action, CN201811547623.5, dated Jul. 23, 2021, 6 pgs.

* cited by examiner

CELL AND BATTERY

CROSS REFERENCE TO RELATED APPLICATION

The present application claims the benefit of prior Chinese Application No. 201811547623.5, filed with the China National Intellectual Property Administration on Dec. 18, 2018. The entire contents of the before-mentioned patent application are incorporated by reference as part of the disclosure of this U.S. application.

FIELD

The present disclosure relates to a technical field of electrochemical devices, and more particularly, to a cell and a battery.

BACKGROUND

A lithium-ion battery has been widely applied to various digital products, electric tools, unmanned aerial vehicles, energy storage systems and vehicle power systems, due to their high energy density, long cycle life, and high performance-price ratio.

Due to characteristics of an aluminum-plastic composite film serving as a packaging material, a sealing reliability of a soft-packaged lithium-ion battery has always been valued by researchers. Especially, the soft-packaged lithium-ion battery applied to an energy storage system has more strict requirements for long-period sealing reliability. A seal portion of the lithium-ion battery, which is obtained by sealing the lithium-ion battery with a seal head (such as a flat seal head or an oblique seal head) and its sealing technology widely used at present, has low sealing strength and short service life (less than three years), and cannot meet the requirement of the lithium-ion battery for the long-period sealing reliability, so that the application of the lithium-ion battery in a long-period energy storage field and a field having high requirements for safety and reliability is limited. The sealing process is a key process during the production and manufacture of the soft-packaged lithium-ion battery. Especially, the side sealing and the vacuum sealing process are very important for the safety and reliability of the battery. Thus, it is needed to develop a sealing technology which can meet the requirement for the long-period sealing reliability.

SUMMARY

The present disclosure aims to solve at least one of the technical problems existing in the related art.

Thus, an aspect of the present disclosure aims to propose a cell, which has advantages of good safety and high seal strength.

The cell according to embodiments of the present disclosure includes a cell body and a packaging pouch configured to accommodate the cell body therein. The packaging pouch includes a seal portion, the seal portion includes a sealed area, and the sealed area defines a cavity therein.

Another aspect of the present disclosure proposes a battery including a cell, and the cell includes a cell body and a packaging pouch for accommodating the cell body therein. The packaging pouch includes a seal portion, the seal portion includes a sealed area, and the sealed area defines a cavity therein.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

The embodiments of the present disclosure are described in detail below, and the examples of the embodiments are illustrated in the accompanying drawings, in which the same or similar reference numerals are used to refer to the same or similar elements or elements having the same or similar functions. The embodiments described below with reference to the accompanying drawings are illustrative and only intended to explain the present disclosure, and are not to be construed as limit the present disclosure.

A cell 100 according to embodiments of the present disclosure is described specifically with reference to FIG. 1 to FIG. 17.

Figure 1:
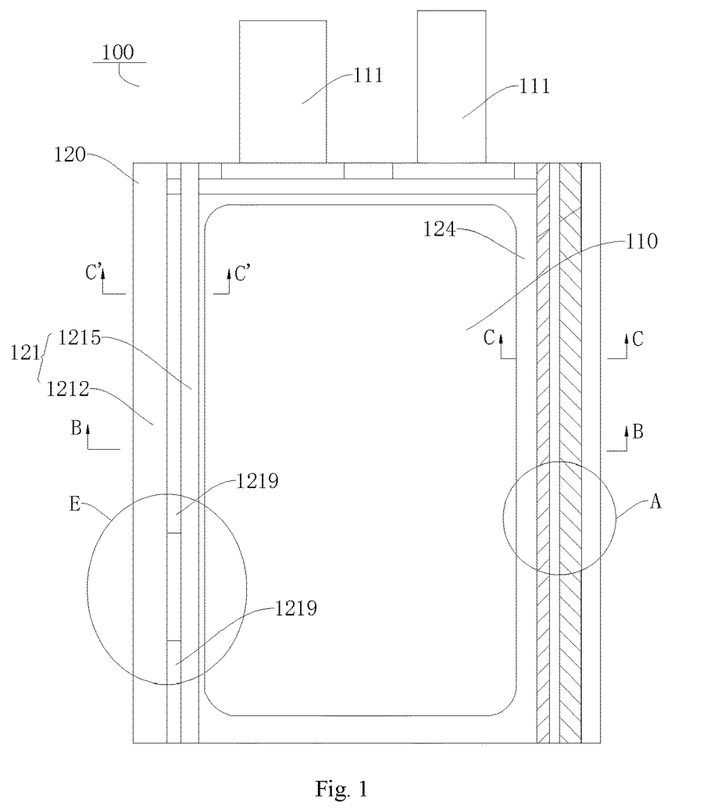
FIG. 1 illustrates a schematic view of a cell according to an embodiment of the present disclosure, in which a cavity is not continuous at a portion E.

As illustrated in FIG. 1, the cell 100 according to embodiments of the present disclosure includes a cell body 110 and a packaging pouch 120 configured to accommodate the cell body 110. The cell body 110 includes an electrode tab 111 extending out of the packaging pouch 120.

Figure 2:
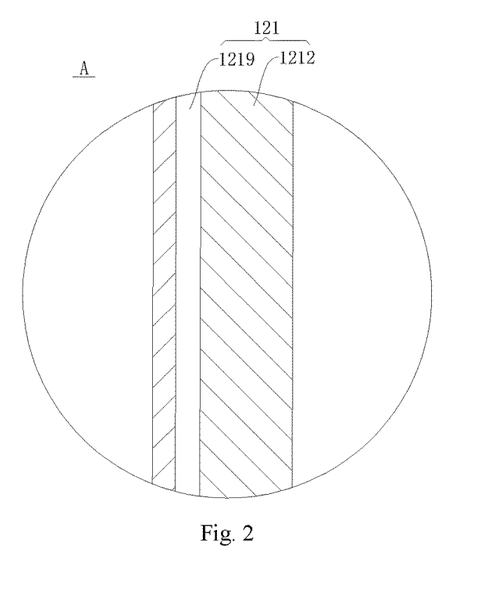
FIG. 2 illustrates a partial enlarged schematic view of a portion A in FIG. 1.
Figure 3:
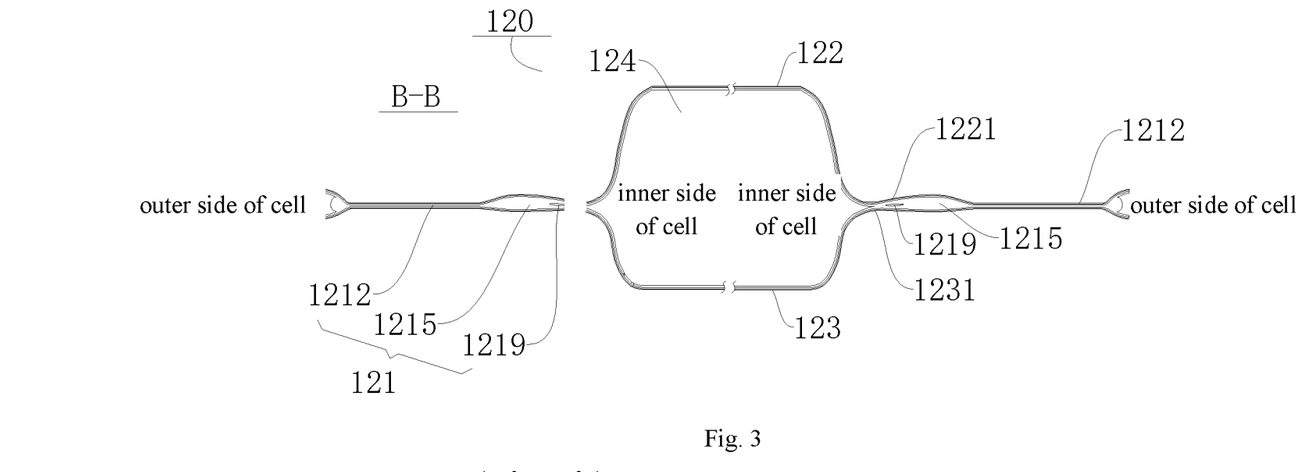
FIG. 3 illustrates a section view of the cell of FIG. 1, taken along a section line B-B.

Specifically, as illustrated in FIGS. 13, the packaging pouch 120 may include a seal portion 121, the seal portion 121 includes a sealed area, and a cavity 1219 is defined in the sealed area. It could be understood that the seal portion 121 of the packaging pouch 120 may be formed by the sealing technology, and the seal portion 121 may be formed by being processed with the heat sealing technology. In the present disclosure, by improving a flowing state of a bonding layer (such as polypropylene (PP)) in a molten state during the sealing of the seal portion 121 of the cell 100, the cavity 1219 is enabled to be defined inside the sealed area of the seal portion 121, which may eliminate the thermal stress resulted by the temperature gradient, the mechanical stress caused by a right-angle seal head on the packaging pouch 120, and the mechanical stress caused by the cell body 110, such that a shape and an appearance of a glue-overflow area of the seal portion 121 may be optimized, a structural defect of the glue-overflow area may be improved, and the sealing strength of the seal portion 121 of the cell 100 may be increased significantly, thereby improving the reliability and safety of the sealing of the cell 100. Compared with the sealing strength of the seal portion produced by the seal head and the sealing technology in the related art, the sealing strength of the seal portion produced by the technical solution of the present disclosure increases by at least 35%, the long period reliability of the sealing of the cell 100 may be greatly improved, and hence the reliability and safety of the sealing of the cell 100 may be greatly improved.

In addition, corresponding to the inner glue-overflow area, when a tensile test is performed on the seal portion 121 having the cavity 1219, there is a plurality of peak values in an obtained tensile curve. However, corresponding to the inner glue-overflow area, when the tensile test is performed on the seal portion produced by the seal head and the sealing technology in the related art, only one relatively sharp peak value is presented in an obtained tensile curve. Therefore, it can be seen that the sealing strength of the seal portion 121 of the cell 100 may be significantly increased by providing the cavity 1219 inside the sealed area, and hence the reliability and safety of the sealing of the cell 100 may be improved.

According to some embodiments of the present disclosure, as illustrated in FIG. 3, the cell 100 includes a first casing 122 and a second casing 123. The first casing 122 includes a first bonding layer 1221, the second casing 123 includes a second bonding layer 1231, and the first bonding layer 1221 and the second bonding layer 1231 are bonded so that the sealed area and an accommodating space 124 for accommodating the cell body 110 are provided. A gap exists between at least a part of the first bonding layer 1221 and the second bonding layer 1231 so as to define the cavity 1219. In this way, the structural stability of the seal portion 121 may be improved, the sealing of the cell 100 is facilitated, and also, it is convenient to provide the sealed area having the cavity 1219 by bonding the first bonding layer 1221 with the second bonding layer 1231.

Figure 4:
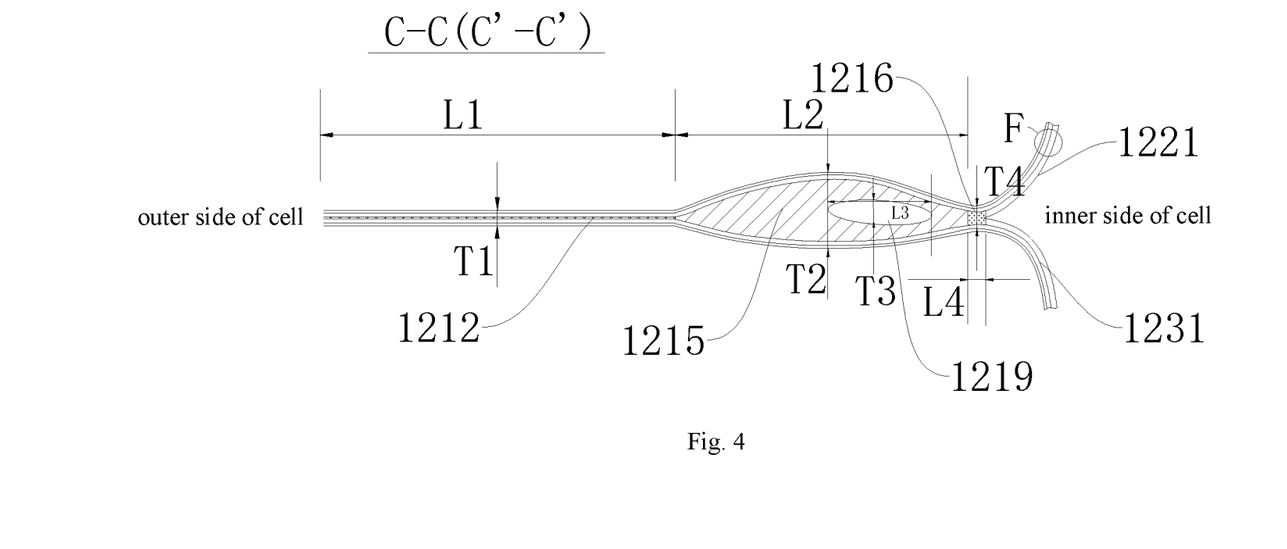
FIG. 4 illustrates a section view of a seal portion of the cell of FIG. 1, taken along a section line C-C or C'-C'.
Figure 5:
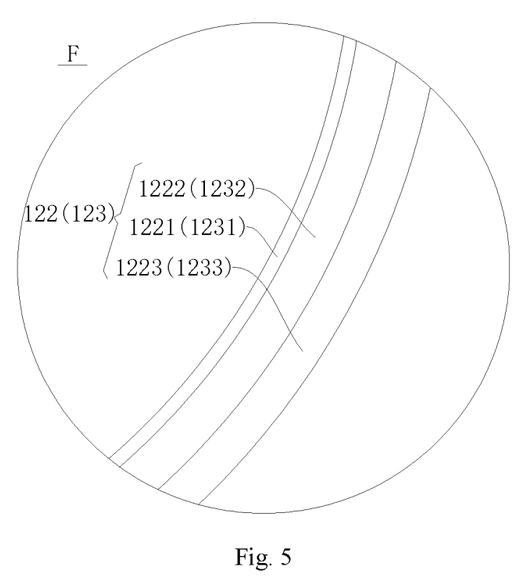
FIG. 5 illustrates a partial enlarged schematic view of a portion F in FIG. 4.

In some embodiments, as illustrated in FIG. 4 and FIG. 5, the first casing 122 further includes a first metal layer 1222 and a first protection layer 1223, and the first metal layer 1222 is arranged between the first protection layer 1223 and the first bonding layer 1221. Similarly, the second casing 123 further includes a second metal layer 1232 and a second protection layer 1233, and the second metal layer 1232 is arranged between the second protection layer 1233 and the second bonding layer 1231. The first protection layer 1223 and/or the second protection layer 1233 may be made of polyamide (PA), polyethylene terephthalate (PET) or a combination thereof. The first metal layer 1222 and/or second metal layer 1232 may be made of aluminum. The first bonding layer 1221 and/or the second bonding layer 1231 may be made of polypropylene (PP), polyethylene (PE), polyethylene naphthalate (PEN) or a combination thereof.

Figure 6:
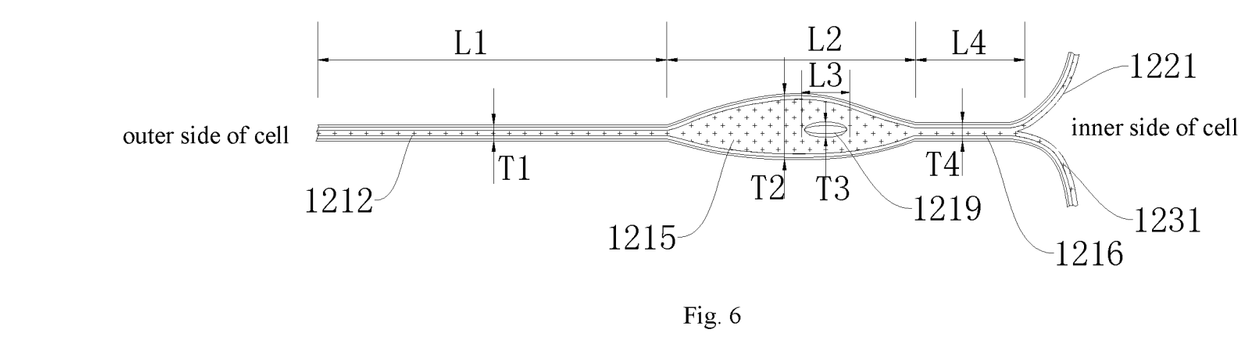
FIG. 6 illustrates a partial section view of a seal portion of a cell according to another embodiment of the present disclosure.

According to some embodiments of the present disclosure, as illustrated in FIG. 4 and FIG. 6, the sealed area includes a first sealed segment 1212, a second sealed segment 1215 and a third sealed segment 1216. The second sealed segment 1215 is arranged between the first sealed segment 1212 and the third sealed segment 1216. The third sealed segment 1216 is arranged between the cell body 110 and the second sealed segment 1215, and is connected with the accommodating space 124. The cavity 1219 is provided in the second sealed segment 1215. It can be understood that the sealed area may be formed by heat-pressing the first bonding layer 1221 and the second bonding layer 1231 by means of the seal head of the present disclosure. After the first bonding layer 1221 and the second bonding layer 1231 are heated to melt, they may flow towards a region of a relatively low pressure when pressed so as to form the glue-overflow area, and the glue-overflow area includes the second sealed segment 1215.

In some embodiments, as illustrated in FIG. 4 and FIG. 6, in a first direction approaching the accommodating space 124, a length of the first sealed segment 1212, i.e., a length between an outermost end surface of the seal portion 121 of the cell 100 and a position where a protrusion of the seal portion 121 appears, is L1, a length of the second sealed segment 1215, i.e., a length between the position where the protrusion appears and a position where the protrusion disappears, is L2. L1/L2 is greater than or equal to 1:10 and less than or equal to 100:1. In some embodiments, L1/L2 is greater than or equal to 1:2 and less than or equal to 50:1. In some embodiments, L1/L2 is greater than or equal to 2:1 and less than or equal to 4:1. A length of the cavity 1219 is L3, and L2/L3 is greater than 2:1 i.e. L2/L3>2. In some embodiments, L2/L3 is greater than or equal to 4:1 and less than or equal to 15:1. A length of the third sealed segment 1216, i.e. a length between the position where the protrusion disappears and a boundary of the accommodating space 124 adjacent to the third sealed segment 1216, is L4, and L2/L4 is greater than 2:1, i.e. L2/L4>2. In some embodiments, L2/L4 is greater than or equal to 4:1 and less than or equal to 7:1. It should be noted that two boundaries of the third sealed segment 1216 (i.e., the position where the protrusion disappears and the boundary of the accommodating space 124 adjacent to the third sealed segment 1216) may be seen clearly from a surface appearance of the seal portion 121 of the cell 100. In other words, the boundaries of the third sealed segment 1216 are left in the seal portion 121 at a side of the seal portion 121 adjacent to the accommodating space 124 by means of the seal head of the present disclosure.

In some embodiments, when control of a seal procedure has a problem, a part of the cavity 1219 is filled with molten first bonding layer 1221 and second bonding layer 1231 formed by the first bonding layer 1221 and the second bonding layer 1231 after being heated. In this case, the cavity 1219 exhibits a discontinuous state, as illustrated at a portion E in FIG. 1.

In some embodiments, as illustrated in FIG. 4 and FIG. 6, in a second direction substantially perpendicular to the first direction, a thickness of the first sealed segment 1212 is T1, a thickness of the second sealed segment 1215 is non-uniform, and the maximum thickness of the second sealed segment 1215 is T2. T1/T2 is less than 1:1, i.e. T1/T2<1. In some embodiments, T1/T2 is greater than or equal to 1:2 and less than or equal to 1:4. A maximum thickness of the cavity 1219 is T3, and T2/T3 is greater than 1:1, i.e. T2/T3>1.

When the thickness of the cavity is very small, T2/T3 may tend to infinity. In some embodiments, T2/T3 is greater than or equal to 8:1 and less than or equal to 30:1. A minimum thickness of the third sealed segment 1216 is T4, and T1/T4 is less than 10:1, i.e. T1/T4<10. In some embodiments, T1/T4 is greater than or equal to 1:3 and less than or equal to 2:1.

In some embodiments, as illustrated in IG. 4 and FIG. 6, in the second direction, a section area (i.e. a longitudinal section area) of the first sealed segment 1212 is K, a sum of section areas of the second sealed segment 1215 and the third sealed segment 1216 is N (not including a section area of the cavity 1219), N/K is greater than or equal to 0.05 and less than or equal to 10. In some embodiments, N/K is greater than or equal to 0.05 and less than or equal to 6. In some embodiments, N/K is greater than or equal to 0.05 and less than or equal to 3. The section area of the cavity 1219 is M, M/N is greater than 0 and less than or equal to 0.6. In some embodiments, M/N is greater than or equal to 0.01 and less than or equal to 0.4. In some embodiments, M/N is greater than or equal to 0.01 and less than or equal to 0.25. It should be noted that each of the section areas is measured in the following method: obtaining a sectional appearance of the seal portion by cutting the seal portion along a section line C-C or C'-C' in FIG. 1, and measuring N, M and K with an area measure function of VHX-5000 microscope (Keyence Corporation).

Figure 7:
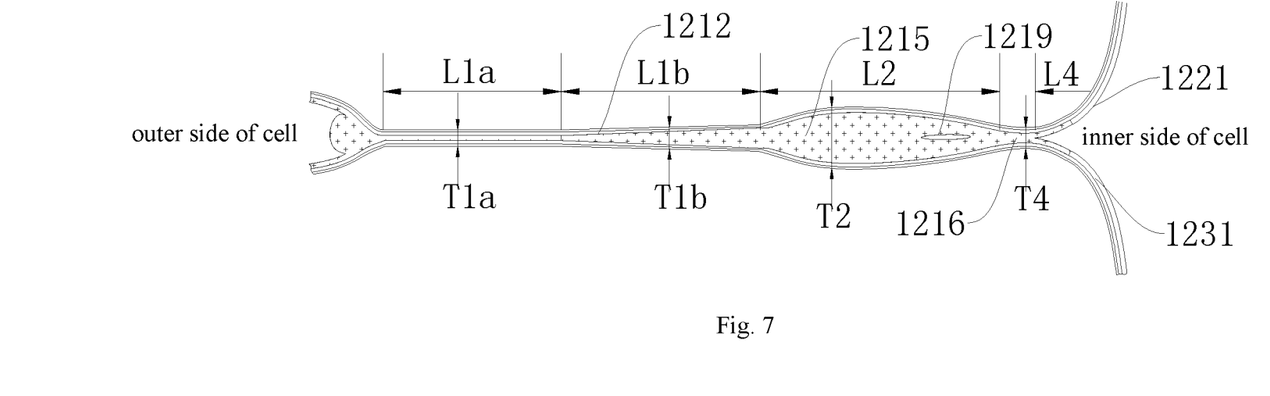
FIG. 7 illustrates a partial section view of a seal portion of a cell according to another embodiment of the present disclosure.

As illustrated in FIG. 7, in some embodiments, in the direction approaching the accommodating space 124, the thickness of the first sealed segment 1212 increases gradually. The first sealed segment 1212 may include a first portion of a uniform thickness and a second portion of a varying thickness. In the direction approaching the accommodating space 124, the thickness of the second portion increases gradually. A length of the first portion is L1$a$, a length of the second portion is L1$b$, and L1$a$/L1$b$ is greater than or equal to 0. When L1$a$ is 0 (that is, the thickness of the first sealed segment 1212 increases gradually overall), L1$a$/L1$b$=0. When L1$b$ is 0 (that is, the thickness of the first sealed segment 1212 doesn't change overall), L1$a$/L1$b$ is infinite. The greater the length of the second portion (that is, the greater the L1$b$), the stronger the ability of the first sealed segment 1212 to resist process fluctuations. The greater the length of the first portion (that is, the greater the L1$a$), the stronger the ability of the first sealed segment 1212 to resist wear. In some embodiments, L1$a$/L1$b$ is greater than or equal to 0.5 and less than or equal to 2.

Figure 8:
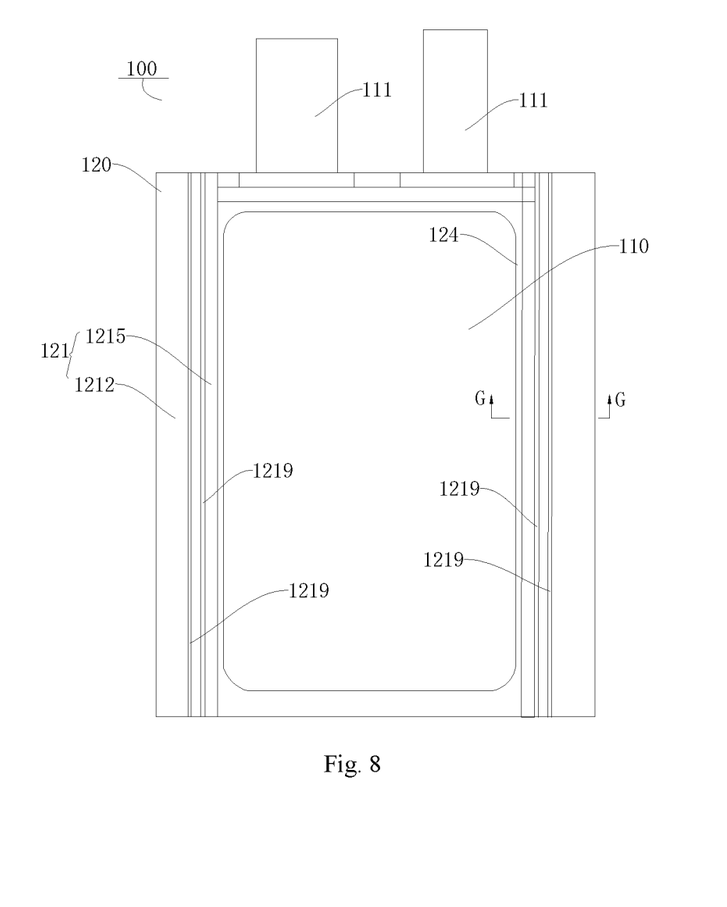
FIG. 8 illustrates a schematic view of a cell according to another embodiment of the present disclosure.
Figure 9:
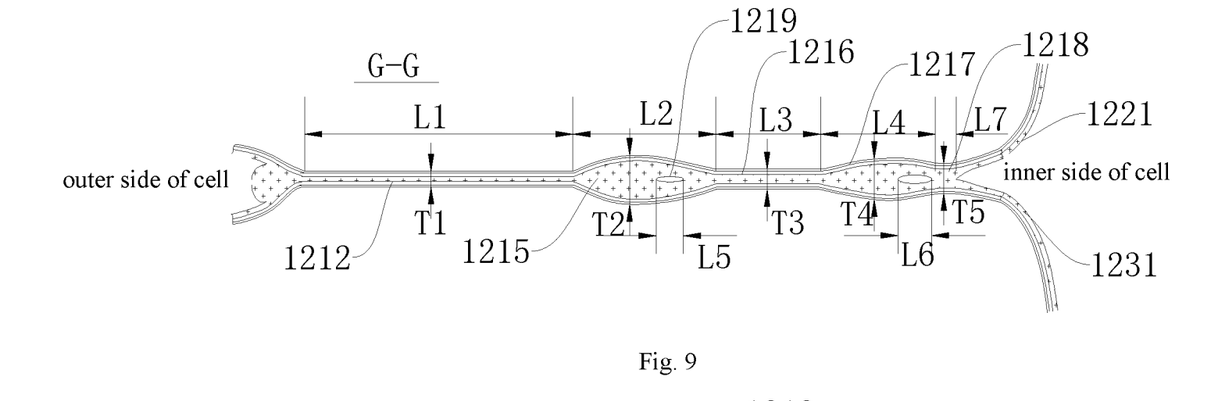
FIG. 9 illustrates a section view of a seal portion of the cell of FIG. 8, taken along a section line G-G.

According to some embodiments of the present disclosure, as illustrated in FIG. 8 and FIG. 9, the sealed area includes the first sealed segment 1212 and the glue-overflow area. The glue-overflow area is provided between the cell body 110 and the first sealed segment 1212, and a plurality of the cavities 1219 are provided in the glue-overflow area so as to further increase the reliability and safety of the sealing of the seal portion 121 of the cell 100. It can be understood that the sealed area may be formed by heat-pressing the first bonding layer 1221 and the second bonding layer 1231 by means of the seal head. After the first bonding layer 1221 and the second bonding layer 1231 are heated to melt, they may flow towards the region of the relative low pressure when pressed so as to form the glue-overflow area, and the glue-overflow area may include multiple combinations of the second sealed segment 1215 and the third sealed segment 1216 mentioned above, such as two, three or more than three, which is not limited in the present disclosure.

In some embodiments, specifically, the glue-overflow area may include the second sealed segment 1215, the third sealed segment 1216, a fourth sealed segment 1217 and a fifth sealed segment 1218. The second sealed segment 1215 is arranged between the first sealed segment 1212 and the third sealed segment 1216, and is connected with the first sealed segment 1212 and the third sealed segment 1216 separately. The fourth sealed segment 1217 is arranged between the third sealed segment 1216 and the fifth sealed segment 1218, and is connected with the third sealed segment 1216 and the fifth sealed segment 1218 separately. The fifth sealed segment 1218 is connected with the accommodating space 124. The second sealed segment 1215 and the fourth sealed segment 1217 are provided with the cavity 1219 therein.

As illustrated in FIG. 9, in some embodiments, in the direction approaching the accommodating space 124, the length of the first sealed segment 1212, i.e., a length between the outermost end surface of the seal portion 121 of the cell 100 and a position where a first protrusion of the seal portion 121 appears, is L1, the length of the second sealed segment 1215, i.e., a length between the position where the first protrusion appears and a position where the first protrusion disappears, is L2, and L1/L2 is greater than or equal to 1:1 and less than or equal to 10:1, that is, 1≤L1/L2≤10. In some embodiments, L1/L2 is greater than or equal to 2:1 and less than or equal to 6:1. In some embodiments, L1/L2 is greater than or equal to 2:1 and less than or equal to 4:1. The length of the third sealed segment 1216, i.e. a length between the position where the first protrusion disappears and a position where a second protrusion appears, is L3, and L1/L3 is greater than 0, i.e. L1/L3>0. In some embodiments, L1/L3 is greater than or equal to 2:1 and less than or equal to 10:1. In some embodiments, L1/L3 is greater than or equal to 2:1 and less than or equal to 4:1.

A length of the fourth sealed segment 1217, i.e., a length between the position where the second protrusion appears and a position where the second protrusion disappears, is L4, and L3/L4 is greater than or equal to 1:1 and less than or equal to 5:1, that is, 1≤L3/L4≤5. In some embodiments, L3/L4 is greater than or equal to 1:1 and less than or equal to 3:1. A length of the cavity 1219 in the second sealed segment 1215 is L5, and L2/L5 is greater than 2:1, that is, L2/L5>2. In some embodiments, L2/L5 is greater than or equal to 4:1 and less than or equal to 10:1. A length of the cavity 1219 in the fourth sealed segment 1217 is L6, and L4/L6 is greater 2:1, that is, L4/L6>2. In some embodiments, L4/L6 is greater than or equal to 4:1 and less than or equal to 10:1. A length of the fifth sealed segment 1218, i.e. a length between the position where the second protrusion disappears and a boundary of the accommodating space 124 adjacent to the fifth sealed segment 1218, is L7, and L3/L7 is greater than 0, that is, L3/L7>0. In some embodiments, L3/L7 is greater than or equal to 2:1 and less than or equal to 20:1. In some embodiments, L3/L7 is greater than or equal to 5:1 and less than or equal to 10:1. It should be noted that two boundaries of the fifth sealed segment (i.e. the position where the second protrusion disappears and the boundary of the accommodating space 124 adjacent to the fifth sealed segment) may be seen clearly from the surface appearance of the seal portion 121 of the cell 100. In other words, the boundaries of the fifth sealed segment 1218 are left in the seal portion 121 at the side of the seal portion 121 adjacent to the accommodating space 124 by means of the seal head of the present disclosure.

As illustrated in FIG. 9, in some embodiments, in the second direction, the thickness of the first sealed segment 1212 is T1, a thickness of the third sealed segment 1216 is T3, and a thickness of the fifth sealed segment 1218 is T5.

When the thicknesses of the first sealed segment 1212 and the third sealed segment 1216 are uniform (that is, unchanged), T3/T1 is greater than 1. In some embodiments, T3/T1 is greater than or equal to 1.1 and less than or equal to 1.5. In addition, when the thicknesses of the first sealed segment 1212 and the third sealed segment 1216 are uniform (that is, unchanged), T3/T1 is greater than 1. In addition, when the thicknesses of the third sealed segment 1216 and the fifth sealed segment 1218 are uniform (i.e. unchanged), T5/T3 is greater than or equal to 1.0. In some embodiments, T5/T3 is greater than or equal to 1.0 and less than or equal to 1.5.

In some embodiments, in the second direction, the thickness of at least one of the first sealed segment 1212 and the third sealed segment 1216 increases gradually. It can be understood that in the direction approaching the accommodating space 124, at least a part of the first sealed segment 1212 has a varying thickness and at least a part of the third sealed segment 1216 has a varying thickness. For example, the first sealed segment 1212 may include the first portion and the second portion mentioned above (as illustrated in FIG. 7), the thickness of the first portion is unchanged, and the thickness of the second portion exhibits an incremental change, i.e., in a direction approaching the second sealed segment 1215, the thickness of the second portion increases gradually. Similarly, the third sealed segment 1216 may also include the first portion and the second portion mentioned above (as illustrated in FIG. 7), the thickness of the first portion is unchanged, and the thickness of the second portion exhibits an incremental change, i.e., in a direction approaching the fourth sealed segment 1217, the thickness of the second portion increases gradually.

When the thicknesses of the first sealed segment 1212 and the third sealed segment 1216 vary, in the direction approaching the accommodating space 124, assuming that an inclined angle of the second portion of the first sealed segment 1212 is α, the length of the first sealed segment 1212 is L1, a maximum thickness of the first sealed segment 1212 is max(T1), a minimum thickness of the first sealed segment 1212 is min(T1), max(T1)=min(T1)+L1·tan α, $0° \leq \alpha \leq 2°$. In the same way, assuming that an inclined angle of the second portion of the third sealed segment 1216 is β, the length of the third sealed segment 1216 is L3, a maximum thickness of the third sealed segment 1216 is max(T3), a minimum thickness of the third sealed segment 1216 is min(T3), max(T3)=min(T3)+L3·tan β, $0° \leq \beta \leq 2°$. In some embodiments, the maximum thickness of the first sealed segment 1212 may be equal to the minimum thickness of the third sealed segment 1216, i.e., max(T1)=min(T3).

Figure 10:
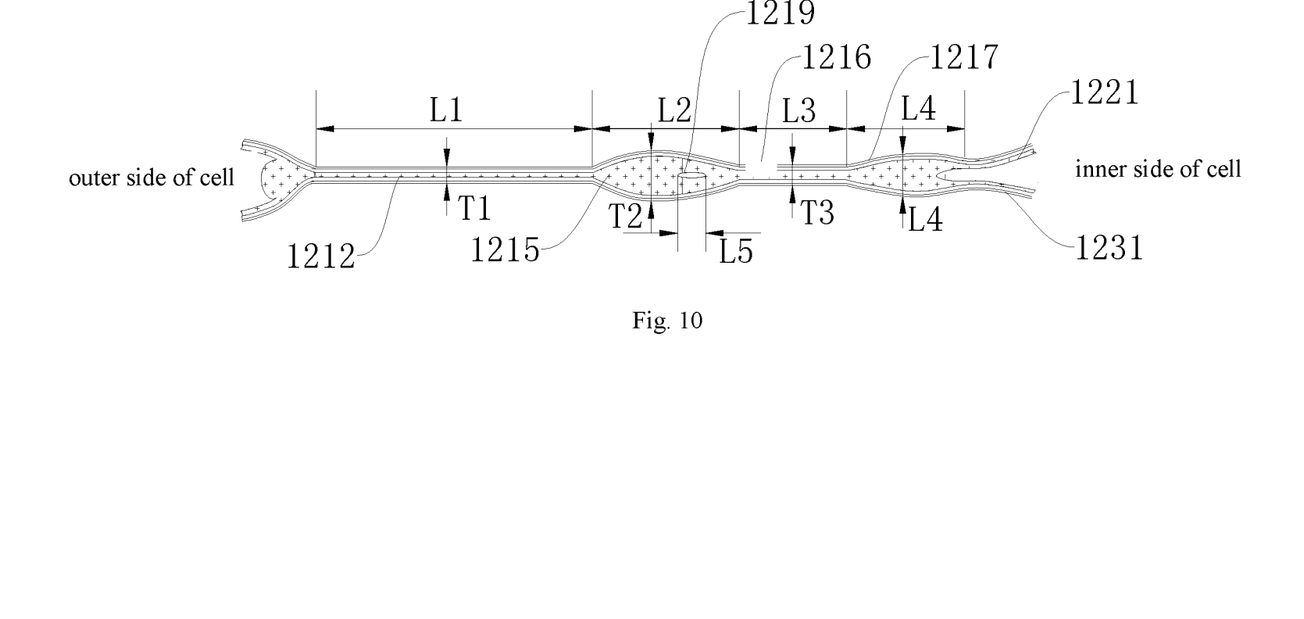
FIG. 10 illustrates a partial section view of a seal portion of a cell according to another embodiment of the present disclosure.

In some embodiments, as illustrated in FIG. 10, the cavity 1219 of the fourth sealed segment 1217 may be directly communicated with the accommodating space 124, that is, the glue-overflow area may not include the fifth sealed segment 1218. In other words, the length of the fifth sealed segment 1218 is very small. In this case, each proportion relationship mentioned above may also be applied herein.

In some embodiments, the cavity 1219 may be continuous or discontinuous. As illustrated at a portion A in FIG. 1, the cavity 1219 is continuous. As illustrated at the portion E in FIG. 1, the cavity 1219 is discontinuous.

Figure 11:
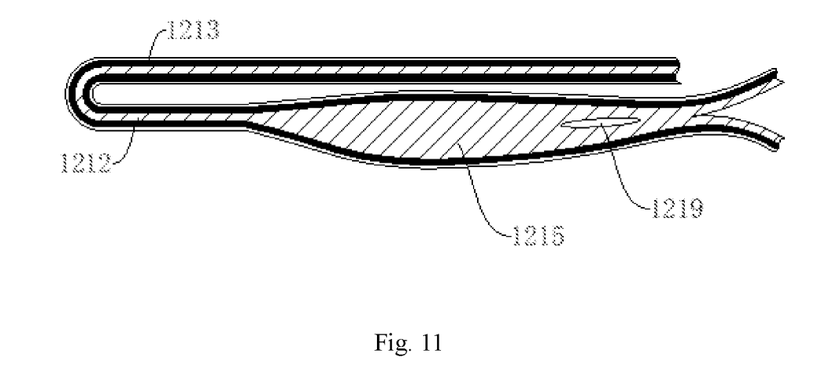
FIG. 11 illustrates a partial section view of a seal portion of a cell according to an embodiment of the present disclosure, in which the seal portion is folded once.
Figure 12:
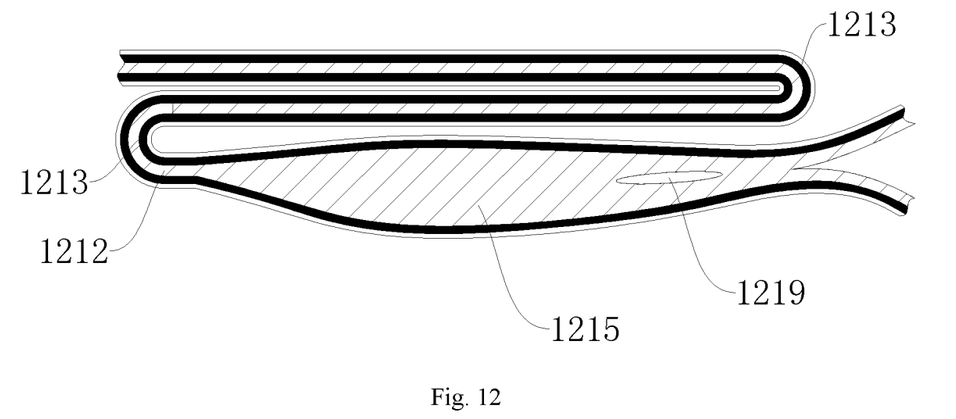
FIG. 12 illustrates a partial section view of a seal portion of a cell according to another embodiment of the present disclosure, in which the seal portion is folded twice.
Figure 13:
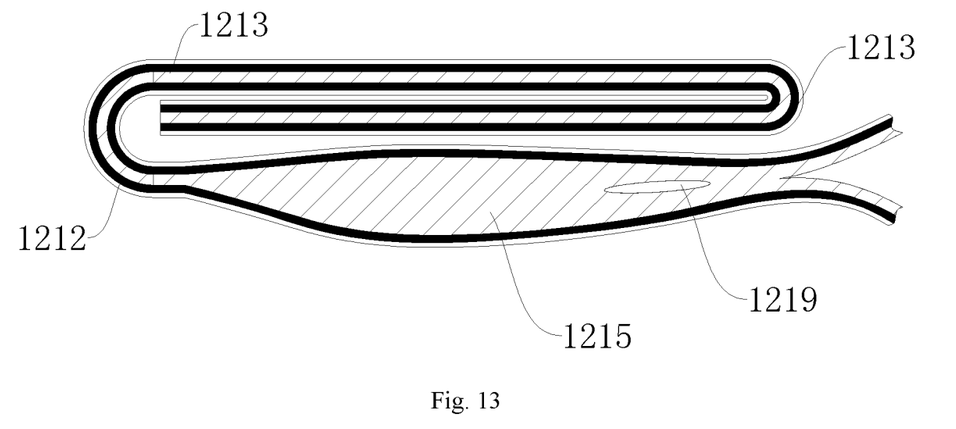
FIG. 13 illustrates a partial section view of a seal portion of a cell according to another embodiment of the present disclosure, in which the seal portion is folded twice.

As illustrated in FIG. 11 to FIG. 13, in some embodiments, the first sealed segment 1212 is bent at least once so as to form at least one folded edge 1213, and the at least one folded edge 1213 has a projection area on the second sealed segment 1215. It can be understood that the projection area is an orthographic projection of the at least one folded edge 1213 on a plane where the second sealed segment 1215 is, and at least a part of the projection area is overlapped with the second sealed segment 1215. Specifically, as illustrated in FIG. 11, the first sealed segment 1212 is bent once in a direction towards the cell body 110 so as to form the folded edge once. As illustrated in FIG. 12 and FIG. 13, the first sealed segment 1212 is bent twice so as to form the folded edge twice.

In some embodiments, as illustrated in FIG. 14 to FIG. 17, a tensile curve of the sealed area has at least two wave crests. It should be noted that the tensile curve may be obtained in the following method: taking FIG. 1 as an example, cutting the sealed area in FIG. 1 open along the section line C-C or C'-C' and cutting it into sample strips having a width (a distance between two ends of the sample strip in a direction perpendicular to the section line C-C or C'-C') of 8 mm (with scissors, blades, die cutters, etc.), clamping the sample strip in a clamp of a universal materials tester (SHENZHEN SUNS TECH STOCK CO., LTD., UTM6101 model) and stretching the sample strip at a speed of 30 mm/min so as to obtain a tensile stress-strain curve, i.e. the tensile curve.

In addition, the present disclosure further provides a battery, which includes the cell 100 in any of the above mentioned cases.

The cell 100 according to embodiments of the present disclosure will be described in detail below with reference to some specific embodiments. It is to be understood that the following description is only illustrative and is not limitation to the present disclosure.

Embodiment One

In this embodiment, the packaging pouch 120 is made of an aluminum-plastic film and configured to accommodate the cell 100 therein. The seal portion 121 of the packaging pouch 120 at a side of the packaging pouch 120 is cut along the section line C-C or C'-C' illustrated in FIG. 1, so as to obtain a section view illustrated in FIG. 6. The length L1 of the first sealed segment 1212 is 5 mm, the length L2 of the second sealed segment 1215 is 3 mm, the maximum length L3 of the cavity 1219 is 0.35 mm, and the length L4 of the third sealed segment 1216 is 2 mm. The thickness T1 of the first sealed segment 1212 is 0.25 mm, the maximum thickness T2 of the second sealed segment 1215 is 0.5 mm, the maximum thickness T3 of the cavity 1219 is 0.25 mm, and the minimum thickness T4 of the third sealed segment 1216 is 0.3 mm.

The longitudinal section area M of the cavity 1219 is 0.028 $mm^2$, the sum N of longitudinal section areas of the second sealed segment 1215 and the third sealed segment 1216 is 0.334 $mm^2$, and the longitudinal section area K of the first sealed segment 1212 is 0.54 $mm^2$, in which M/N=0.08, and N/K=0.62.

Figure 14:
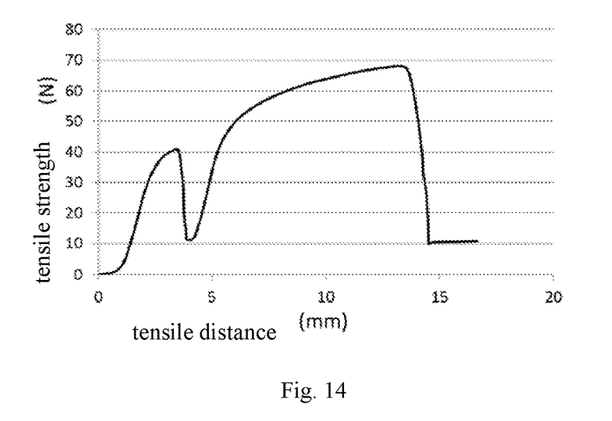
FIG. 14 illustrates a tensile curve of a seal portion according to embodiment one of the present disclosure.

The seal portion 121 at the side of the packaging pouch 120 obtained in embodiment one is cut open and cut into sample strips having the width of 8 mm, and a tensile test is performed on the sample strip in the universal materials tester to obtain the tensile curve illustrated in FIG. 14. It can be seen from FIG. 14 that two peak values exist in the tensile curve, the first peak value exhibits a tensile force of 41N, and the second peak value exhibits a tensile force of 68N. When the sample strip is stretched, the aluminum-plastic film is broken, but the sealed area formed by the first bonding layer 1221 and the second bonding layer 1231 is not separated.

Embodiment Two

The packaging pouch 120 is made of an aluminum-plastic film and configured to accommodate the cell 100 therein.

The seal portion 121 of the packaging pouch 120 at a side of the packaging pouch 120 is cut along the section line C-C or C'-C' illustrated in FIG. 1, so as to obtain the section view illustrated in FIG. 4. In the this embodiment, the length L1 of the first sealed segment 1212 is 3 mm, the length L2 of the second sealed segment 1215 is 1 mm, the maximum length L3 of the cavity 1219 is 0.018 mm, and the length L4 of the third sealed segment 1216 is 0.3 mm. The thickness T1 of the first sealed segment 1212 is 0.18 mm, the maximum thickness T2 of the second sealed segment 1215 is 0.33 mm, the thickness of the cavity 1219 is very small, and the minimum thickness T4 of the third sealed segment 1216 is 0.22 mm.

The longitudinal section area M of the cavity 1219 is 0.007 mm$^2$, the sum N of longitudinal section areas of the second sealed segment 1215 and the third sealed segment 1216 is 0.289 mm$^2$, and the longitudinal section area K of the first sealed segment 1212 is 0.24 mm$^2$, in which M:N=0.024 and N:K=1.2.

Figure 15:
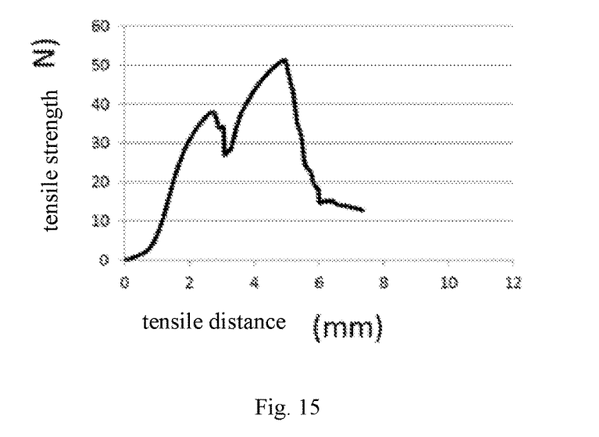
FIG. 15 illustrates a tensile curve of a seal portion according to embodiment two of the present disclosure.

The seal portion 121 at the side of the packaging pouch 120 obtained in embodiment two is cut open and cut into sample strips having the width of 8 mm, and a tensile test is performed on the sample strip in the universal materials tester to obtain the tensile curve illustrated in FIG. 15. It can be seen from FIG. 15 that two peak values exist in the tensile curve, the first peak value exhibits a tensile force of 37N, and the second peak value exhibits a tensile force of 52N. When the sample strip is stretched, the aluminum-plastic film is broken to a small extent, but the sealed area formed by the first bonding layer 1221 and the second bonding layer 1231 is not separated.

Embodiment Three

Different from embodiment two, in this embodiment, the length L1 of the first sealed segment 1212 is 4.5 mm, the length L2 of the second sealed segment 1215 is 3.3 mm, the maximum length L3 of the cavity 1219 is 1.4 mm, and the length L4 of the third sealed segment 1216 is 0.22 mm. The thickness T1 of the first sealed segment 1212 is 0.15 mm, the maximum thickness T2 of the second sealed segment 1215 is 0.39 mm, the maximum thickness T3 of the cavity 1219 is 0.29 mm, and the minimum thickness T4 of the third sealed segment 1216 is 0.31 mm.

The longitudinal section area M of the cavity 1219 is 0.119 mm$^2$, the sum N of longitudinal section areas of the second sealed segment 1215 and the third sealed segment 1216 is 0.431 mm$^2$, and the longitudinal section area K of the first sealed segment 1212 is 0.045 mm$^2$, in which M:N=0.028 and N:K=9.6.

Figure 16:
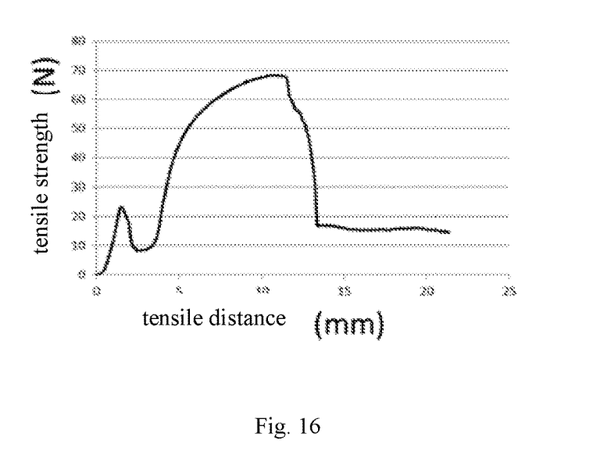
FIG. 16 illustrates a tensile curve of a seal portion according to embodiment three of the present disclosure.

The seal portion 121 at a side of the packaging pouch 120 obtained in embodiment three is cut open and cut into sample strips having the width of 8 mm, and a tensile test is performed on the sample strip in the universal materials tester to obtain the tensile curve illustrated in FIG. 16. It can be seen from FIG. 16 that the first peak value exhibits a tensile force of 24N, and the second peak value exhibits a tensile force of 68N. When the sample strip is stretched, the aluminum-plastic film is broken, but the sealed area formed by the first bonding layer 1221 and the second bonding layer 1231 is not separated.

Embodiment Four

The packaging pouch 120 is made of an aluminum-plastic film and configured to accommodate the cell 100 therein. The seal portion 121 of the packaging pouch 120 at a side of the packaging pouch 120 is cut along the section line C-C or C'-C' illustrated in FIG. 1, so as to obtain the section view illustrated in FIG. 7. In this embodiment, the first sealed segment 1212 includes the first portion with an unchanged thickness and the second portion with a varying thickness. The length L1$a$ of the first portion is 3 mm, and the thickness T1$a$ of the first portion is 0.23 mm. The length L1$b$ of the second portion is 3 mm, and the minimum thickness min (T1$b$) of the second portion is 0.23 mm. In the direction approaching the accommodating space 124, the inclined angel α of the second portion is 1°, and the maximum thickness of the second portion satisfies a formula that max(T1$b$)=min(T1$b$)+L1$b$·tan α=0.28 mm.

The length L2 of the second sealed segment 1215 is 3.5 mm, and the maximum thickness T2 of the second sealed segment 1215 is 0.42 mm. The length L3 of the cavity 1219 is 1.2 mm, and the maximum thickness T3 of the cavity 1219 is 0.05 mm. The length L4 of the third sealed segment 1216 is 2 mm, and the minimum thickness T4 of the third sealed segment 1216 is 0.30 mm.

Figure 17:
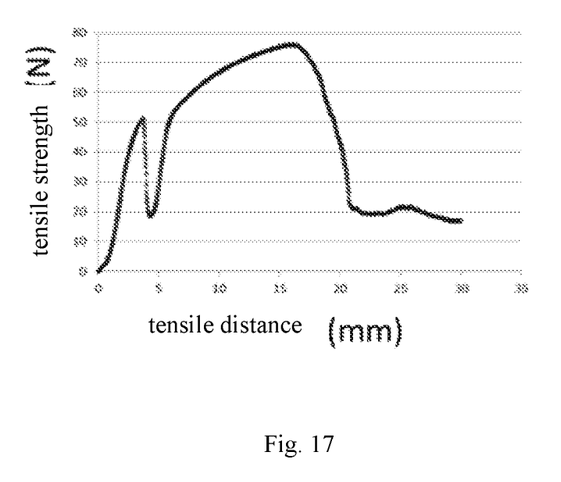
FIG. 17 illustrates a tensile curve of a seal portion according to embodiment four of the present disclosure.

The seal portion 121 at the side of the packaging pouch 120 obtained in embodiment four is cut open and cut into sample strips having the width of 8 mm, and a tensile test is performed on the sample strip in the universal materials tester to obtain the tensile curve illustrated in FIG. 17. It can be seen from FIG. 17 that the tensile curve has two characteristic peaks, the first peak value exhibits a tensile force of 50.9N corresponding to the strength of the third sealed segment 1216, and the second peak value exhibits a tensile force of 75.8N corresponding to the strength of the second sealed segment 1215. When the sample strip is stretched, the second sealed segment 1215 is first separated, and then the sealed area formed by the first bonding layer 1221 and the second bonding layer 1231 is broken, but not separated.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not require that the present disclosure be constructed or operated in a particular orientation, which may not be understood to limit the present disclosure. In the description of the present disclosure, "a plurality of" means two or more than two.

Reference throughout this specification to "an embodiment," "some embodiments," "illustrative embodiments," "an example," "a specific example," or "some examples" means that a particular feature, structure, material, or characteristic described in connection with the embodiment or example is included in at least one embodiment or example of the present disclosure. Thus, the appearances of these phrases in various places throughout this specification are not necessarily referring to the same embodiment or example of the present disclosure. Furthermore, the particular features, structures, materials, or characteristics may be combined in any suitable manner in one or more embodiments or examples.

While the embodiments of the present disclosure have been illustrated and described, it will be understood by those skilled in the art that various changes, alternatives, variation and modifications may be made in the embodiments without departing from spirit and principles of the present disclosure, and the scope of the present disclosure is defined by the claims and their equivalents.

What is claimed is:

1. A cell, comprising:
 a cell body; and
 a packaging pouch configured to accommodate the cell body therein, the packaging pouch comprising
 a first casing, the first casing comprises a first bonding layer; and
 a second casing, the second casing comprises a second bonding layer,
 wherein the first bonding layer and the second bonding layer are bonded to define an accommodating space for accommodating the cell body and form a seal portion,
 wherein the seal portion comprises a sealed area, and the sealed area defines a cavity therein between at least a part of the first bonding layer and the second bonding layer, and
 wherein the seal portion has a variable thickness along a direction away from the cell body such that the sealed area including the cavity has a thickness greater than both that of a segment of the seal portion immediately adjacent to the accommodating space and that of a segment of the seal portion further away from the accommodating space than the sealed area including the cavity.

2. The cell according to claim 1, wherein the sealed area comprises:
 a first sealed segment;
 a second sealed segment connected with the first sealed segment, the cavity is disposed in the second sealed segment; and
 a third sealed segment connected with the accommodating space and arranged between the cell body and the second sealed segment.

3. The cell according to claim 2, wherein in a direction approaching the accommodating space, a length of the first sealed segment is L1, a length of the second sealed segment is L2, and L1/L2 is greater than or equal to 1:10 and less than or equal to 100:1;
 a length of the cavity is L3, and L2/L3 is greater than 2:1; and
 a length of the third sealed segment is L4, and L2/L4 is greater than 2:1.

4. The cell according to claim 2, wherein a thickness of the first sealed segment is T1, a maximum thickness of the second sealed segment is T2, and T1/T2 is less than 1:1;
 a maximum thickness of the cavity is T3, and T2/T3 is greater than 1:1; and
 a minimum thickness of the third sealed segment is T4, and T1/T4 is less than 10:1.

5. The cell according to claim 2, wherein a section area of the first sealed segment along a longitudinal direction of the cell is K, a sum of section areas of the second sealed segment and the third sealed segment along the longitudinal direction of the cell is N, N/K is greater than or equal to 0.05 and less than or equal to 10; and a section area of the cavity along the longitudinal direction of the cell is M, M/N is greater than 0 and less than or equal to 0.6.

6. The cell according to claim 2, wherein in a direction approaching the accommodating space, a thickness of the first sealed segment increases gradually.

7. The cell according to claim 2, wherein the first sealed segment is bent at least once so as to form at least one folded edge, and the at least one folded edge has a projection area on the second sealed segment.

8. The cell according to claim 1, wherein the sealed area comprises:
 a first sealed segment; and
 a glue-overflow area arranged between the cell body and the first sealed segment, the cavity is disposed in the glue-overflow area.

9. The cell according to claim 8, wherein the glue-overflow area comprises:
 a second sealed segment connected with the first sealed segment;
 a third sealed segment connected with the second sealed segment, the second sealed segment is arranged between the first sealed segment and the third sealed segment;
 a fourth sealed segment connected with the third sealed segment; and
 a fifth sealed segment connected with the accommodating space, the fourth sealed segment is arranged between the third sealed segment and the fifth sealed segment,
 wherein the second sealed segment and the fourth sealed segment each define the cavity therein.

10. The cell according to claim 9, wherein in a direction approaching the accommodating space, a length of the first sealed segment is L1, a length of the second sealed segment is L2, and L1/L2 is greater than or equal to 1:1 and less than or equal to 10:1;
 a length of the third sealed segment is L3, and L1/L3 is greater than 0;
 a length of the fourth sealed segment is L4, L3/L4 is greater than or equal to 1:1 and less than or equal to 5:1;
 a length of the cavity in the second sealed segment is L5, and L2/L5 is greater than 2:1;
 a length of the cavity in the fourth sealed segment is L6, and L4/L6 is greater than 2:1; and
 a length of the fifth sealed segment is L7, and L3/L7 is greater than 0.

11. The cell according to claim 9, wherein a thickness of the first sealed segment is T1, a thickness of the third sealed segment is T3, a thickness of the fifth sealed segment is T5, and when the thickness of each of the first sealed segment, the third sealed segment and the fifth sealed segment is uniform, T3/T1 is greater than or equal to 1.1 and less than or equal to 1.5, and T5/T3 is greater than or equal to 1.0 and less than or equal to 1.5.

12. The cell according to claim 9, wherein in a direction approaching the accommodating space, a thickness of at least one of the first sealed segment and the third sealed segment increases gradually.

13. The cell according to claim 1, wherein the cavity is continuous.

14. The cell according to claim 1, wherein the cavity is discontinuous.

15. A battery, comprising:
 a cell, the cell comprising:
 a cell body; and
 a packaging pouch configured to accommodate the cell body therein, the packaging pouch comprising
 a first casing, the first casing comprises a first bonding layer; and
 a second casing, the second casing comprises a second bonding layer,
 wherein the first bonding layer and the second bonding layer are bonded to define an accommodating space for accommodating the cell body and form a seal portion, wherein the seal portion comprises a sealed area, and the sealed area defines a cavity therein between at least a part of the first bonding layer and the second bonding layer, and wherein the seal portion has a variable thickness along a direction away from the cell body such that the sealed area including the cavity has a thickness greater than both that of a segment of the seal portion immediately adjacent to the accommodating space and that of a segment of the seal portion further away from the accommodating space than the sealed area including the cavity.

16. The battery according to claim 15, wherein the sealed area comprises:
    a first sealed segment;
    a second sealed segment connected with the first sealed segment, the cavity is disposed in the second sealed segment; and
    a third sealed segment connected with the accommodating space and arranged between the cell body and the second sealed segment.

17. The battery according to claim 15, wherein the sealed area comprises:
    a first sealed segment; and
    a glue-overflow area arranged between the cell body and the first sealed segment, the cavity is disposed in the glue-overflow area.

18. The battery according to claim 17, wherein the glue-overflow area comprises:
    a second sealed segment connected with the first sealed segment;
    a third sealed segment connected with the second sealed segment, the second sealed segment being arranged between the first sealed segment and the third sealed segment;
    a fourth sealed segment connected with the third sealed segment; and
    a fifth sealed segment connected with the accommodating space, the fourth sealed segment is arranged between the third sealed segment and the fifth sealed segment,
    wherein the second sealed segment and the fourth sealed segment each define the cavity therein.

* * * * *